United States Patent

Batchelor et al.

[11] 3,894,897
[45] July 15, 1975

[54] TIRE RECAPPING PROCESS AND APPARATUS

[75] Inventors: Kenneth W. Batchelor, Pleasanton; Warren L. Dexter, Orinda, both of Calif.

[73] Assignee: Electra-Bond, Inc., Livermore, Calif.

[22] Filed: June 17, 1974

[21] Appl. No.: 479,867

Related U.S. Application Data

[63] Continuation-in-part of Ser. No. 390,388, Aug. 22, 1973.

[52] U.S. Cl............... 156/96; 456/128 R; 156/275; 264/25; 264/27; 264/277; 264/315; 264/326; 475/41
[51] Int. Cl............................. B29h 17/36
[58] Field of Search....... 156/394 FM, 128, 96, 124, 156/275, 394, 129, 128 R; 425/41; 264/25, 27, 277, 315, 326

[56] References Cited
UNITED STATES PATENTS

| | | | |
|---|---|---|---|
| 1,339,736 | 5/1920 | Burke | 156/275 |
| 1,375,360 | 4/1921 | Burke | 156/128 R |
| 1,805,026 | 5/1931 | State | 156/128 R |
| 2,421,099 | 5/1947 | Vogt | 156/96 |
| 2,662,045 | 12/1953 | Baggott | 156/183 |
| 2,774,409 | 12/1956 | Skidmore | 156/96 |
| 2,966,936 | 1/1961 | Schelkmann | 156/96 |
| 3,348,640 | 10/1967 | Thompson et al. | 156/275 |
| 3,558,383 | 1/1971 | LeJeune | 156/96 |

FOREIGN PATENTS OR APPLICATIONS

| | | | |
|---|---|---|---|
| 555,690 | 9/1943 | United Kingdom | 156/96 |
| 117,696 | 1/1945 | Sweden | 156/275 |

*Primary Examiner*—Clifton B. Cosby
*Attorney, Agent, or Firm*—Gregg, Hendricson & Caplan

[57] ABSTRACT

Method and apparatus for retreading tires with electrical resistance wires for heating the rubber to vulcanize same including the attachment of wires between thin metal base strips within a rubber cushion disposed beneath a new tread element and upon a tire casing. Sealing means are provided along the edges of the cushion containing heating wires to preclude the entrance of air along the edges of the vulcanization to preclude combustion and ensure superior bonding.

6 Claims, 6 Drawing Figures

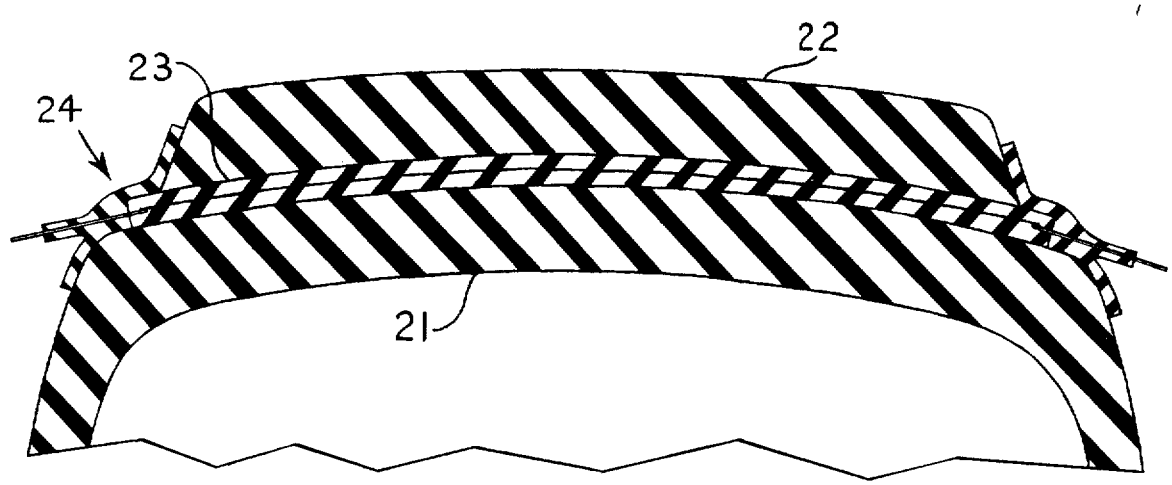
FIG. 1
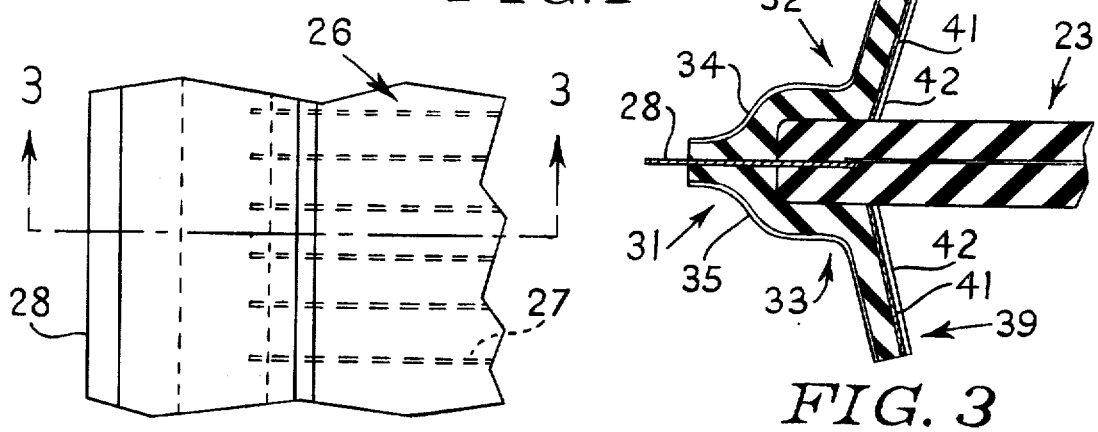
FIG. 2
FIG. 3
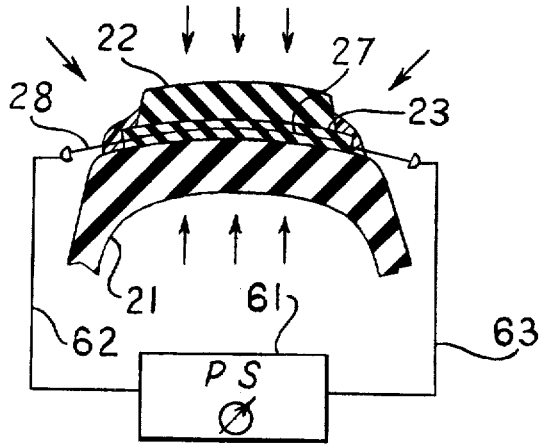
FIG. 6
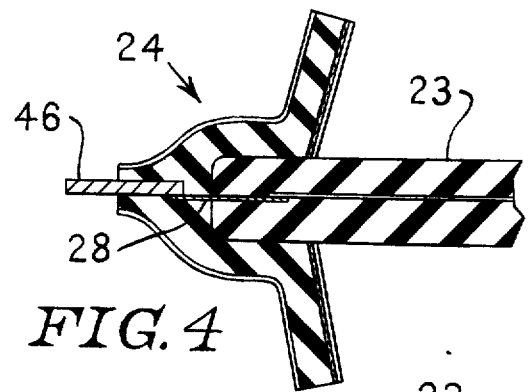
FIG. 4
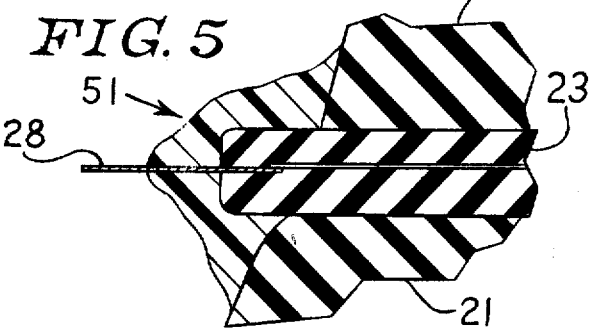
FIG. 5

TIRE RECAPPING PROCESS AND APPARATUS

The present application is a continuation-in-part of U.S. patent application Ser. No. 390,388 filed in the U.S. Pat. Office on Aug. 22, 1973 for "Process of Tire Recapping and Cushion Therefor".

BACKGROUND OF INVENTION

It is known in the recapping of tires for vehicles to employ electrical heating wires for vulcanizing new tread onto a tire casing or carcass. Such a method is, for example, disclosed in the early U.S. Pat. No. 1,216,654 issued in 1917, and subsequent improvements therein are reflected in later patents such as U.S. Pat. Nos. 1,422,537 and 1,690,615 by the same inventor.

The generation of heat by electrically energized wires disposed upon a tire casing for the purpose of recapping a tire raises the exciting possibility of tire recapping without requiring molds and other complicated equipment. Additionally such a process could possibly be performed in the field so that very large tires, for example, such as employed on off-road vehicles would not have to be physically transported to and from recapping facilities.

Various difficulties have been encountered in the practical application of the general principle enunciated in the foregoing patents. Bonding of new tread to an old casing requires the application of heat and pressure and difficulties have been encountered in the proper application of such pressure. Additional difficulty has been encountered in properly and uniformly applying the heat through the resistance wires. Overheating of the wire ends causes sparking, burn-out of wires, and ignition of the rubber being operated upon, while conduction of heat from the wires to electrical buses or the like causes uneven application of heat to the rubber to be bonded.

The present invention provides method and apparatus for overcoming the foregoing difficulties so as to materially simplify the recapping process while producing an improved product.

A method and apparatus for overcoming the above-noted difficulties is disclosed and claimed in U.S. patent application Ser. No. 390,388 filed in the U.S. Patent Office on Aug. 22, 1973 for "Process of Tire Recapping and Cushion Therefor." The present invention provides an improvement upon this method and in certain respects provides alternatives to particular steps and structures therein.

SUMMARY OF INVENTION

The method of the present invention provides for the application upon a buffed tire casing or carcass of a strip or cushion including rubber and electrical heating wires extending transversely of the casing thereabout with new tread being disposed atop the cushion about the casing. The cushion extends laterally outward from the tread on both sides thereof with the heating wires terminating slightly outward of the edges of the tread. A very thin strip of electrically conducting material is disposed in each side of the cushion engaging the heating wires thereat to place these wires in parallel electrical connection and this strip extends from the edges of the cushion.

The edges of the cushion are sealed to the tire carcass and to the tread by a plastic or rubber material and either the thin metal strips or separate metal base strips secured thereto extend from the sealing means for connection across a source of electrical power. A current is controllably passed through the heating wires while bonding pressure is applied to the tread and carcass. Preferably bonding pressure is applied by compressed air acting directly upon tread and tire carcass and the controlled application of heat and pressure bonds the tread to the tire. The sealing means and thin metal strips (including base strips if employed) are then stripped from the tire to produce a recapped tire. Bonding of tread to tire carcass requires only a few minutes with the expenditure of only a small amount of electrical power.

The present invention provides sealing elements or means about the casing covering the edges of the cushion and adapted to be sealed to both casing and tread. The sealing means are electrically insulating and heat conducting. The sealing means provide for the utilization of a very thin electrically conducting strip along the ends of the heating wires and yet prevents overheating at the edges of the tread which could otherwise cause overheating and possible combustion. The sealing means are furthermore advantageous in sealing the cushion against the intrusion of air between cushion and tread and cushion and casing, particularly during the application of air pressure during tread bonding to casing.

In order to provide a practical tire retreading process by electrical heating, it is necessary to provide a high heat impedance at the ends of the heating wires and a low current impedance thereat. A high current impedance or electrical impedance beyond the ends of the heating wires will cause unwanted heating thereat which is often quite destructive. As noted in the above-identified patent application of Warren Dexter, it is particularly important to ensure the even application of heat for good bonding of tread to casing and primary problems occur along the edges of the tread whereat the heating wires terminate. The present invention ensures even heating and precludes undesirable overheating exteriorly of the tread by the use of sealing means along the edges of the tread with such means having good heat conduction properties. By the employment herein of a very thin strip of electrically conducting material along the edges of the cushion engaging the heating wires, there is achieved a high heat impedance to limit heat conduction outside of the processing area and a low electrical impedance to minimize heat generation exteriorly of the processing area.

The process and apparatus of the present invention is particularly adapted for utilization in connection with the apparatus of U.S. patent application Ser. No. 462,105 filed in the U.S. Patent Office on Apr. 18, 1974 and entitled "Electrical Bonding System for Tire Recapping". The edge sealing of the present invention precludes entry of air into the processing or retreading areas even though a high pressure atmosphere is employed in the processing.

DESCRIPTION OF FIGURES

The present invention is illustrated as to particular preferred embodiments thereof in the accompanying drawings wherein:

FIG. 1 is a transverse sectional view through the outer part of a tire casing having the cushion of the present invention disposed thereon with new tread disposed atop the cushion about the casing and sealing means affixed along the cushion edges;

FIG. 2 is a partial plan view of a vulcanizing cushion in accordance with the present invention;

FIG. 3 is a partial sectional view taken in the plane 3—3 of FIG. 2;

FIG. 4 is a partial sectional view of an alternative embodiment of the cushion and sealing means and taken in a plane such as that of FIG. 3;

FIG. 5 is a partial sectional view taken in the same plane as FIG. 1 and illustrating alternative edge sealing means in accordance with the present invention; and FIG. 6 is a schematic illustration of the application of heat and pressure for tire recapping in accordance with the present invention.

DESCRIPTION OF PREFERRED EMBODIMENTS

The tire recapping process of the present invention employs electrical heating and preferably air pressure for bonding precured new tread to an old buffed tire casing or carcass. The process incorporates edge sealing of a cushion of uncured rubber containing heating wires to a tire casing and new tread. Various sealing means may be employed herein and thus, before further describing the process hereof, such means, together with associated elements, are described in connection with the illustration in the drawings.

There is illustrated in FIG. 1 of the drawings part of a tire casing 21 to be recapped and having a new tread 22 disposed thereabout with a vulcanizing element 22 disposed thereabout with a vulcanizing cushion 23 between the casing and tread. It will be appreciated that the tire casing is originally buffed to provide a relatively circular rough outer surface for attachment of new tread to the casing. The lateral extent of the cushion 23 will be seen to be greater than the width of the new tread 22 for reasons described below. In FIG. 1 the tire carcass is crosshatched to illustrate rubber; however, it will be appreciated that such carcass normally incorporates fabric or metal cords, belts and the like, in accordance with conventional tire manufacture. There is also illustrated edge sealing means 24 for sealing the cushion to both tread 22 and carcass 21, as described in detail below.

Referring now to FIGS. 2 and 3 of the drawings, it will be seen that the cushion 23 incorporates a grid 26 for supplying heat during tire retreading and includes heating wires 27 embedded in the uncured rubber of the cushion. These heating wires 27 are disposed in parallelism across the cushion and are connected at opposite ends to thin metal strips 28. It will thus be seen that the heating wires are electrically connected in parallel across the cushion and the very thin metal strips 28 extend from the lateral edges of the cushion.

Referring particularly to FIG. 3 where one edge sealing means is shown, it will be seen that such sealing means 31 includes a pair of strips 32 and 33 of uncured rubber or some other type of two-way stretch material and disposed one above and one below the cushion edge. These strips 32 and 33 are bonded together and to the outer edge of the cushion along the top and bottom thereof as illustrated in extension laterally outward of the cushion and also have inner edges thereof extending above and below the cushion. The strips 32 and 33 preferably have a thin covering of sheet material 34 and 35, respectively, bonded to the outer surfaces thereof as shown. This coating or covering may have a smooth surface and facilitates handling of the cushion and sealing means during utilization.

The outer edges of the sealing strips 32 and 33 cover a portion of the thin metal strip 28 along the length thereof, as shown, with the edge of the strip 28 extending beyond the sealing means to be available for connection to power supply means for energizing the heater wires. As noted above, the sealing strips 32 and 33 include inner edges or portions 38 and 39 extending outwardly from the top and bottom of the cushion for sealing engagement with tread and carcass during tire recapping. In order to accomplish this sealing both of these inner portions of the sealing strips have an adhesive 41 applied to the inner surface of the strips with a removable covering 42 thereover. This inner covering or coating 42 prevents the strips from inadvertently adhering to the cushion or other elements and is readily removed as by stripping it away so as to expose the adhesive 41 when the cushion and sealing means are in position. This then provides for attachment of the inner portions 38 and 39 of the sealing means to the tread and to the carcass of the tire being retreaded in accordance with the present invention.

It is to be particularly noted that the upper and lower sealing strips 32 and 33 hereof are sealed to the outer edges of the cushion 23 about the thin metal strip 28. Thus, when the sealing means are attached to the tread and carcass of the tire being recapped with the cushion 23 between tread and carcass, there is achieved a complete airtight seal along the edges of tread and carcass including the cushion 23. This is highly advantageous in preventing any possible entry of air between the cushion and either tread or carcass, for such may produce imperfections in the bonding of tread to carcass.

It is additionally noted that the present invention provides for applying heating current to the heating wires 27 without any problem of overheating exteriorly of the tread. The heating wires terminate outwardly of the lateral edges of the tread and yet must be electrically energized to provide the requisite heating. The above-identified U.S. patent application Ser. No. 390,388 provides a particular solution to the problem of exterior overheating and possible combustion and the present invention provides an improvement thereon, not only with regard to the exclusion of air from bonding areas but also by the provision of an alternative manner of heating wire energization. While a very thin metal strip 28 in itself is applicable for the connection of a power supply to the heating wires, such a strip is not normally mechanically suitable. The present invention provides for encasing this strip in the sealing means of the present invention. The thin metal strip has a low electrical impedance and a relatively high heat impedance so that the heater wires are readily energized and heat conduction from the ends thereof is minimized. Additionally the sealing means provides for heat conduction away from this thin metal strip and, furthermore, precludes air from contacting the strip to possibly cause combustion. It will thus be seen that there is provided hereby method and means for carrying out electrical heating for tire recapping in a truly practical manner.

It is possible to vary the sealing means from that described above and in this respect reference is made to FIG. 4 illustrating one such variation. As noted above, the thin metal strips 28 have very little structural strength and thus in the embodiment of FIG. 4 there is additionally provided a metal base strip 46 engaging each strip 28. The thin metal strip 28 is contacted by the heating wires within the cushion 23 and extends slightly from the cushion edge whereat the base strip is attached thereto over the length thereof. The sealing means 31 covers the thin metal strip 28 and a part of the width of the base strip 46 with an edge of the base strip being exposed for attachment to power supply means. The remainder of the cushion and sealing means may be the same as illustrated in FIG. 3 and described above.

Additionally it is possible to vary the structure of the sealing means as shown, for example, in FIG. 5. Rather than employing separate sealing strips 32 and 33, as shown in FIG. 3, edge sealing may be accomplished by the application of a flexible plastic sealant 51 along the edges of the cushion 23 after same has been positioned between the tire casing and tread. This sealant 51, which may comprise a resin such as polyester resin, for example, encompasses the outer edge of the cushion 23 and a portion of the thin metal strip (or base strip if employed) and engages both tire casing and tread to thus seal the cushion to tread and casing as the sealing means 31 described above. It will be appreciated that there may be certain disadvantages to the method and system illustrated in FIG. 5 such as, for example, the necessity of skilled personnel to apply the sealing means or the provision of additional equipment for such purpose. By employing a sealant 51 which sets up as a rigid coating, it is possible to readily and rapidly remove the sealant merely by depressing the tire tread and casing along the cushion edge to part the solidified sealant therefrom. It is, however, to be appreciated that a wide variety of different materials may be employed as the sealant, even including highly viscous materials that do not completely solidify, and the sealant material is herein generally denominated as rubber-like materials or plastics.

Considering now the process of tire recapping of the present invention, reference is made to FIG. 6. Upon a buffed tire carcass or casing 21 there is placed the cushion 23 of this invention formed, as noted above, of heating wires 27 in a layer of uncured rubber and such cushion is wrapped circumferentially around the casing. The precured tread 22 is then wrapped around the casing over the cushion and maintained in position by any desired means such as annular hoops or the like. The edges of the cushion are then sealed as described above and in FIG. 6 there is illustrated a sealant 51 covering the cushion edges and engaging both casing and tread so as to completely seal the cushion to the casing and tread. The thin metal strips 28 extend outwardly from the sealant 51 and a power supply 61 is connected by leads 62 and 63 to the strips 28 on opposite edges of the cushion. The heat required for vulcanizing the rubber of the cushion 23 is obtained by passing an electrical heating current through the heating wires 27 of the cushion and this current is passed therethrough at a low voltage for a controlled period of time and at a controlled amplitude. In order to bond the tread to the casing, it is not only necessary to heat the rubber but also to apply pressure to force the tread and casing together with the cushion therebetween. This pressure is preferably applied as air pressure. In this respect it is noted that the system of U.S. patent application Ser. No. 462,105, assigned to the same assignee as the present application, may be employed. By placing the tire casing with the cushion and tread thereabout in a pressure vessel, electrically connecting the power supply to the cushion as stated above, and then pressurizing the vessel with the sealing means along the cushion edges, the requisite heat and pressure are attained for bonding of the tread to the casing. The process of this invention may be operated with a pressure of 70 lbs. per square inch applied to casing and tread and it will be appreciated that the heating current and time of application thereof may be optimized for particular applications. It is normally advantageous to minimize the time and very good tread to casing bonding has been achieved in 12 minutes with the process of this invention.

Following bonding of the tread to the casing, the pressure is removed as by venting the pressure chamber and the electrical connections 62 and 63 are disconnected from the cushion. With a sealant 51 that hardens into a solid same may be readily disengaged from the tread and casing by resiliently deflecting the tread and casing around the edges thereof engaged by the sealant. The outer portion of the cushion may then be removed by firmly gripping same and tearing the outer portion of the cushion and thin metal strip away from the remainder about the circumference of the tire on each side thereof. There thus results from this process a high quality recapped tire.

It is particularly noted that the recapping process of the present invention may be carried out in a very short period of time, as of the order of a few minutes as noted above, and this, of course, is highly advantageous. It is also noted that only a relatively small amount of electrical energy is required to provide the heat necessary for bonding of tire to casing in this process. This also is highly advantageous, particularly in view of the national and, in fact, international energy crises. Further to this point it is noted that, for a 10.00–22 size tire the process of the present invention may employ 1,560 watts for a curing time of 15 minutes with the resultant energy utilization of 0.39 kilo watt hours per tire to recap same. This amount of electrical energy is less than 4 percent of the energy required to recap the same tire by conventional means. The reduction in time required to recap such tires is also remarkable for conventional recapping requires about 5½ hours curing time per tire as compared to the above-noted 15 minutes curing time in the stated example of the present invention. Consequently less than 5 percent as much time is required by the process of the present invention.

There has been described above the process of tire recapping of this invention together with a description of particular edge sealing structure for use in tire recapping and it is believed apparent that the present invention as described provides a material advancement in the art. It will, however, be appreciated by those skilled in the art that various modifications are possible within the spirit of the present invention and thus it is not intended to limit the invention to the precise terms of description nor details of illustration.

What is claimed is:

1. A process for recapping tires comprising the steps of
    forming a strip cushion of transverse heating wires embedded in rubber with a thin metal strip along each edge thereof connected to said wires,
    wrapping said strip cushion circumferentially about a tire casing, wrapping new tire tread about said cushion circumferentially of said tire casing, sealing the edges of said cushion to said tire casing and tread over the entire length thereof and along both sides thereof with sealing means encompassing a part of each of said thin metal strips, applying air pressure to said tire casing and tread thereabout, and electrically energizing said thin metal strips to pass an electrical current through said heating wires whereby said tread is bonded by heat and pressure to said tire casing.

2. The process of claim 1 further defined by sealing said cushion to tread and casing by attaching a thin sealing strip of flexible material impenetrable by air along the upper and lower face of each cushion edge including a part of each of said thin metal strips, and adhering the sealing strips along the upper cushion edges to said tread and adhering the sealing strips along the lower cushion edges to said tire casing for precluding the intrusion of air between tread and casing.

3. The process of claim 1 further defined by removing said thin metal strips and sealing means by tearing same from opposite cushion edges about the tire casing.

4. The process of claim 1 further defined by sealing said cushion edges by applying a flowable plastic along said edges against both tread and tire casing and partially covering the thin metal strips.

5. A process of bonding new precured tread to a buffed tire casing comprising the steps of wrapping circumferentially about said casing a strip cushion of uncured rubber having transverse heating wires therein and a thin metal strip extending therefrom along each edge with said wires electrically connected between strips, wrapping said new tread circumferentially about said casing upon said cushion with the cushion edges extending laterally of the tread about the casing, sealing the cushion edges to both tread and casing with the outer portion of the thin metal strips being uncovered by sealing means, applying air under pressure directly to all surfaces of tread and casing to force tread and casing together under pressure, passing an electric current through said heating wires from said thin metal strips to apply heat to said cushion, tread and casing whereby the tread is bonded to the casing, and stripping said thin metal strips and sealing means from bonded tread and casing.

6. The process of claim 5 further defined by sealing said cushion edges to said tread and casing by adhering to each cushion edge a pair of separate strips of rubber with one on the top and one on the bottom of each of said thin metal strips and said separate strips having the inner edges thereof extending upwardly and downwardly, respectively, from said cushion with adhesive on the inner faces thereof and attached thereby to tread and casing.

* * * * *